US009703827B2

(12) United States Patent
Clark et al.

(10) Patent No.: US 9,703,827 B2
(45) Date of Patent: Jul. 11, 2017

(54) METHODS AND APPARATUS FOR PERFORMING REAL-TIME ANALYTICS BASED ON MULTIPLE TYPES OF STREAMED DATA

(71) Applicant: Illumina Consulting Group, Inc., Potomac, MD (US)

(72) Inventors: Ed Clark, Baltimore, MD (US); Thomas Foughner, Herndon, VA (US); John Halper, Glenwood, MD (US); John Hicks, Arnold, MD (US); Nicholas Stroh, Baltimore, MD (US); David Waldrop, Potomac, MD (US); Graydon Weideman, Baltimore, MD (US)

(73) Assignee: Illumina Consulting Group, Inc., Potomac, MD (US)

( * ) Notice: Subject to any disclaimer, the term of this patent is extended or adjusted under 35 U.S.C. 154(b) by 269 days.

(21) Appl. No.: 14/334,213

(22) Filed: Jul. 17, 2014

(65) Prior Publication Data
US 2016/0019258 A1    Jan. 21, 2016

(51) Int. Cl.
G06F 17/30    (2006.01)
G06F 21/44    (2013.01)
G06F 11/30    (2006.01)

(52) U.S. Cl.
CPC ........ G06F 17/30392 (2013.01); G06F 11/30 (2013.01); G06F 21/44 (2013.01)

(58) Field of Classification Search
None
See application file for complete search history.

(56) References Cited

U.S. PATENT DOCUMENTS

| | | | |
|---|---|---|---|
| 9,417,759 B1* | 8/2016 | Srinivasan | G06F 3/0481 |
| 2006/0122946 A1* | 6/2006 | Fahrny | G06Q 20/3829 |
| | | | 705/71 |
| 2010/0017379 A1* | 1/2010 | Naibo | G06Q 10/06 |
| | | | 707/E17.014 |
| 2011/0313987 A1* | 12/2011 | Ghosh | G06F 17/30675 |
| | | | 707/706 |
| 2015/0205862 A1* | 7/2015 | Campagne | G06F 17/2755 |
| | | | 707/754 |
| 2015/0293974 A1* | 10/2015 | Loo | G06F 17/30516 |
| | | | 707/752 |
| 2015/0381679 A1* | 12/2015 | De Smet | G06F 17/30867 |
| | | | 709/219 |

OTHER PUBLICATIONS

Mundy, J., "Design Tip #158 Making Sense of the Semantic Layer", Kimball Group, Aug. 4, 2013, 6 pages.

* cited by examiner

*Primary Examiner* — Jay Morrison
(74) *Attorney, Agent, or Firm* — Cooley LLP

(57) ABSTRACT

Streaming data from a plurality of streaming data sources can be received. The streaming data may not be stored in persistent storage. A query can be received from a client device. A rule can be defined based on the query. The rule can be applied to the streaming data. Alerts associated with a subset of the streaming data that matches the rule can be stored in persistent storage. A signal associated with the alerts can be sent to the client device such that the graphical user interface is updated based on the alerts.

21 Claims, 7 Drawing Sheets

METHODS AND APPARATUS FOR PERFORMING REAL-TIME ANALYTICS BASED ON MULTIPLE TYPES OF STREAMED DATA

BACKGROUND

Some embodiments described herein relate generally to methods and apparatus for performing real-time analytics based on multiple types of streamed data. Some embodiments relate to complex-event processing and/or performing analytics on streaming data without storing some or all of the streaming data in persistent storage. Specifically, some embodiments relate to methods and apparatus for providing an end user a graphical user interface such that the end user can craft complex queries and/or rules to be executed against the streaming data.

Complex-event processing (CEP) generally refers to systems involving identifying, tracking, and/or analyzing complex-events based on multiple streams of data and/or data from multiple sources. An event can be, for example, any occurrence or specific instance of an activity that can be inferred from the data. A complex-event is an event that cannot be inferred from any single stream or source of data, i.e., more than one data stream and/or source are to be analyzed to identify a complex-event.

Some known complex-event processing systems are able to infer complex-events from multiple data sources under certain circumstances, for example, when the streaming data is of a particular pre-defined format and/or when the streaming data is below a threshold quantity. Known complex-event processing systems, however, are generally unsuitable for scaling to accept arbitrary quantities of data and/or handling data that arrives intermittently, in various and/or changing formats, and/or accepting new data streams having different data structures as compared to existing data streams.

Furthermore, known complex-event processing systems are generally pre-configured by experts and/or programmers to identify anticipated events, i.e., when the characteristics of the target event are known in advance such that complex rules can be constructed by individuals with programming expertise. Known complex-event processing systems are generally unsuitable to enable end users, such as analysts who may not have advanced computer programming skills, to identify new events or new types of events. Accordingly, a need exists for methods and apparatus that are scalable; suitable to handle diverse streams of data, diverse data structures and/or diverse data quality; and/or suitable to allow end users without advanced programming experience to define rules such that the end users can identify new and/or previously unexpected events.

SUMMARY

A method can include receiving, at a compute device, streaming data from multiple streaming data sources. The streaming data may not be stored in persistent storage. A query can be received from a client device. A rule can be defined based on the query. The rule can be applied to the streaming data. Alerts associated with a subset of the streaming data that matches the rule can be stored in persistent storage. A signal associated with the alerts can be sent to the client device such that the graphical user interface is updated based on the alerts.

DETAILED DESCRIPTION

Some embodiments described herein relate to methods that can include receiving, at a compute device, streaming data from multiple of streaming data sources. The streaming data may not be stored in persistent storage. A query can be received from a client device. A rule can be defined based on the query. The rule can be applied to the streaming data. Alerts associated with a subset of the streaming data that matches the rule can be stored in persistent storage. A signal associated with the alerts can be sent to the client device such that the graphical user interface is updated based on the alerts.

Some embodiments described herein relate to methods that can include receiving, at a compute device, streaming data from multiple streaming data sources. The streaming data may not be stored in persistent storage. A signal can be sent to a client device such that the client device renders a graphical user interface that presents at least a portion of the streaming data. A request to define a rule can be received from the client device in response to a user of the client device making a form-based selection via the graphical user interface. The rule can be applied to the streaming data and at least one datum matching from the rule can be stored in persistent storage. A signal can be sent to the client device such that an alert based on the datum is presented via the graphical user interface.

Some embodiments described herein relate to methods that can include rendering a graphical user interface presenting a first datum from one of several streaming data sources. At least some of the data from the streaming data sources may not be stored in persistent storage. In response to a user interacting with the graphical user interface, a rule can be defined. For example, user interactions can be translated into a rule language. A server can be sent a signal representing the rule. In response, a second datum can be received from the server.

Figure 1:
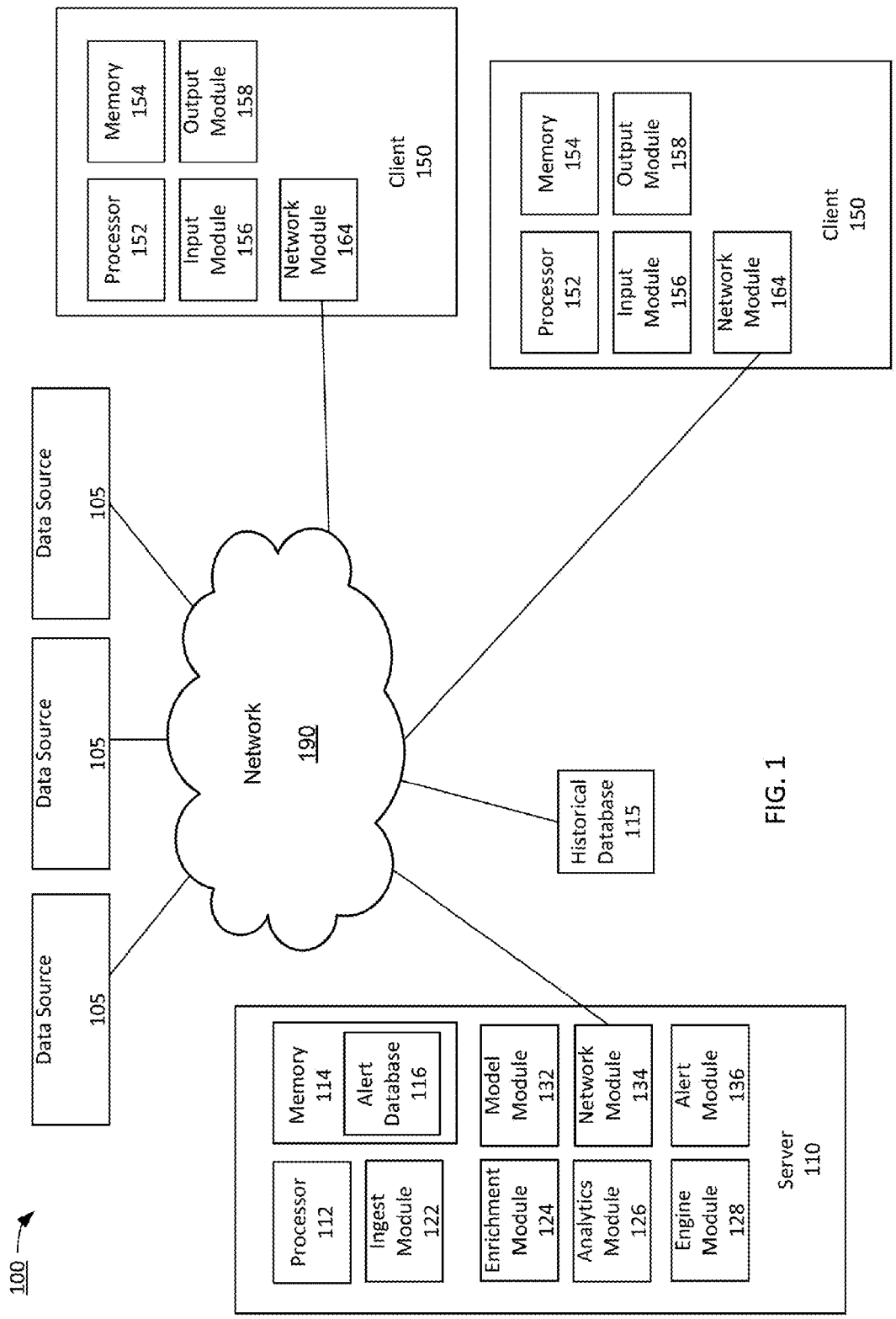
FIG. 1 is a block diagram of a complex-event processing system, according to an embodiment.

FIG. 1 is a block diagram of a complex-event processing system 100, according to an embodiment. The system 100 includes a server 110, two client devices 150, a historical database 115, and multiple data sources 105. Any one of the server 110, the client devices 150, the historical database 115, and/or the data sources 105 can be communicatively coupled to any other of the server 110, the client devices 150, the historical database 115, and/or the data sources 105 via a network 190. Although two client devices 150 and three data sources 105 are shown, other embodiments can include any number of client devices 150 and/or data sources 105 including a single client device 150 and/or a single data source 105.

The server 110 is a compute device having a processor 112, a memory 114, an ingest module 122, an enrichment module 124, an analytics module 126, an engine module 128, a model module 132, a network module 134, and an alert module 136. Each of the processor 112, the memory 114, the ingest module 122, the enrichment module 124, the analytics module 126, the engine module 128, the model module 132, the network module 134, and/or the alert module 136 can be operatively or communicatively coupled to one or more of the other modules.

The processor 112 can be, for example, a general purpose processor, a Field Programmable Gate Array (FPGA), an Application Specific Integrated Circuit (ASIC), a Digital Signal Processor (DSP), and/or the like. The processor 112 can be configured to retrieve data from and/or write data to memory, e.g., the memory 114, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. The memory 114 includes a historical database 115 and an alert database 116. The historical database 115 and/or the alert database 116 can be local, remote, and/or distributed stores of data.

The network module 134 can be a wired and/or wireless transmission module operable to communicatively couple the server 110 to the network 190. For example, the network module 134 can be a wired and/or wireless network interface controller (NIC), a cellular telephone module, a Bluetooth® module, a ZigBee® module, ultrasonic, magnetic and/or any other suitable module configured to send and/or receive signals via the network 190.

The network 190 can be the Internet, an intranet, a local area network (LAN), a wide area network (WAN), a virtual network, a telecommunications network, any other suitable communication system and/or combination of such networks. The network 190 can be implemented as a wired and/or wireless network.

The ingest module 122 can be hardware and/or software (configured to execute on the processor 112 and/or stored in memory 114) operable to process multiple sources of streaming data. For example, the ingest module 122 can be operable to receive and/or process data from each of the data sources 105. In some embodiments, each of the data sources 105 can have a different format, can generate, receive, and/or report data at different times and/or with different frequencies. The ingest module 122 can be operable to process and/or format data associated with each of the data sources 105. For example, the ingest module 122 can detect and/or extract salient features of streaming data. In some embodiments, the ingest module 122 can be pre-programmed to recognize the format of data from each of the data sources 105 such that the ingest module 122 can convert, extract, filter, and/or otherwise process the streaming data. In some embodiments, the ingest module 122 can be highly scalable and/or allow parallel processing of data from the data sources 105. The ingest module can include or implement a data integration platform, such as IBM InfoSphere®.

The enrichment module 124 can be hardware and/or software (configured to execute on the processor 112 and/or stored in memory 114) operable to modify the streaming data. For example, as described in further detail herein, the enrichment module can add data to the data streams received by the ingest module 122. The enrichment module 124 can add data to data streams without the data from the data sources 105 being stored in persistent storage.

The analytics module 126 can be hardware and/or software (configured to execute on the processor 112 and/or stored in memory 114) operable to receive streaming data from the ingest module 122 and/or enrichment module 124. The analytics module 126 can be operable to perform statistical and/or predictive modeling analyses on the streaming data. For example, the analytics module 126 can be operable to calculate a moving average of a data stream. In some embodiments, the analytics module 126 can be operable to store and/or execute predictive modeling markup language (PMML) or any other suitable modeling sub-modules. As described in further detail herein, the analytics module 126 can produce an output that can be treated or further analyzed similarly to the streaming data (e.g., similarly to outputs from the ingest module 122 and/or enrichment module 124).

The analytics module 126 can optionally be operationally coupled to the model module 132. In some embodiments, the model module 132 can be operable to perform more complex data processing, such as using neural networks, logical regression, machine learning, and/or any other suitable analysis can be performed. In other embodiments, the analytics module 126 can include the model module 132 and/or otherwise be operable to perform any suitable analytics and/or modeling. For example, the model module 132 can be operable to import models developed outside the system 100 (e.g., via an independent model development suite).

In some embodiments, the analytics module 126 can be operable to perform analysis on and/or define new and/or modified data streams (an analytic) associated with an identified target. For example, in an embodiment where at least one data source 105 provides data associated with the location of objects (e.g., automobiles, ships, inventory items, etc.), the analytics module 126 can be operable to define a stream of data associated with one or more of the objects. For example, the analytics module 126 can be operable to generate an analytic associated with other objects that are within a predefined distance from an identified object. Such a data stream can be referred to as a derivative data. In this example, the derivative data does not include data about objects outside of the predefined distance from the identified object. The analytics module 126 can further be operable to update the analytic (e.g., in real time) as the identified object moves, such that, for example, the data stream can include data associated with objects that come within a distance of the identified object (e.g., a pre-determined distance and/or a distance selected by a user of a client device 150) as the result of the identified object's movement and/or as a result of the movement of other objects. In this example, the derivative data no longer includes data for objects that are no longer within the predefined distance from the identified object. As a further example, the analytics module 126 can be operable to identify objects that travel with the identified object by, for example, calculating distances between the identified object and other objects, the number of data points in which the identified object and another object are near each other, the duration for which the identified object and other objects are near each other, the distances the identified object and the other objects travel, and so forth.

In some embodiments, the model module 132 can be operably coupled to the historical database 115 associated with streaming data. For example, as described in further detail herein, in some embodiments, the engine module 128 can be operable to cause a subset of data from or associated with the streaming data to be stored in the historical database 115 (e.g., in non-volatile memory). The model module 132 can be operable to create, define, train, tune, and/or otherwise process the streaming and/or historical data (e.g., data stored in persistent storage such as the historical database 115 and/or the alert database 116). The model module 132 can be operable to identify correlations in historical data and/or generate predictive models. In some embodiments, the model module 132 can generate a derivative stream of data. Similarly stated, the model module 132 can generate a new and/or modified stream of data based on the streaming data. Such derivative data can be further analyzed by the analytics module 126 and/or the engine module 128 in a manner similar to the streaming data from the data sources 105.

For example, the model module 132 can be operable to construct forecasts and/or create predictions. Similarly stated, the model module 132 can output a stream of derivative data that is predictive (i.e., predictive data). Such predictive data can be associated with a time in the future. In some embodiments, predictive data can be treated by, for example, the engine module 128 similar to data received from the data sources 105 such that alerts can be generated based on predictive data. In some such embodiments, such alerts can be identified as predictive alerts. The model module 132 can be operable to compare predictive data against data received from the data sources 105 (e.g., after the time associated with the predictive data has occurred) to determine the accuracy of the predictive data. The model module 132 can update and/or refine a model based on the accuracy of the predictive data.

The engine module 128 can be hardware and/or software (configured to execute on the processor 112 and/or stored in memory 114). As will be described in further detail herein, the engine module 128 can receive signals associated with a user of a client device 150 querying the streaming data. The engine module 128 can define a rule in response to the query and/or apply the rule to the streaming data. The engine module 128 can generate an alert based on a datum from the streaming data matching or satisfying the rule. The engine module 128 can be operable to apply the rule to each streaming data source 105 in parallel and/or can apply the rule to a datum received from a streaming data source in substantially real-time without storing the datum in persistent storage. Rules can be continuously and/or indefinitely applied to the streaming data by the engine module 128. For example, as additional streaming data is received from the data sources 105, additional alerts can be generated and, optionally, signals associated with the additional alerts can be sent to a client device 150. In other embodiments, rules can have a limited duration, be configured to expire, and/or be configured to produce a single or a particular number of alerts.

The alert module 136 can be operatively coupled to the engine module 128 such that the alert module 136 can manage alerts and/or can be operable to generate different levels of alerts. For example, a first level of alert can be generated by the engine module 128 any time a datum from the streaming data sources 105 (and/or derivative data from the analytics module 126 and/or the model module 132) matches or satisfies a rule defined by the engine module 128. A second level of alert can be generated by the alert module 136 when the number of first-level alerts exceeds a pre-defined and/or configurable threshold. Similarly, a third level of alert can be generated by the alert module 136 when the number of second-level alerts exceeds a pre-defined and/or configurable threshold. Any number of levels of alerts can be similarly generated by the alert module 136 and/or the engine module 128.

The server 110 can be operable to send a signal to a client device 150 when an alert occurs. For example the server 110 can notify a client device 150 of the alert, send the datum that triggered the alert, contextual data, information associated with the rule that triggered the alert, and/or any other suitable information (e.g., via the network module 134 and/or network 190). In some embodiments, the server 110 can send a signal to a client device 150 when the alert meets certain criteria. For example, the server 110 can send a signal to a first client device 150 when a first-level alert occurs and can send a signal to a second client device 150 when a second-level alert occurs. For another example, the server 110 can send a signal to a first client device 150 but not a second client device 150 when an alert occurs based on a rule that was defined in response to a query made by the first client device 150. For yet another example, the server 110 can send a signal to a client device 150 for each alert triggered by rules the user of the client device 150 has "activated" or otherwise indicated that the client device 150 is monitoring (e.g., in some embodiments, a client device 150 can be operable to activate rules defined in response to a request from another client device 150). In some embodiments, the signal sent by the server 110 when an alert occurs can be operable to cause a client device 150 to perform a particular action, such as update a GUI, buy or sell on an exchange, send a signal to a control system (e.g., a programmable logic controller, an embedded controller, etc.), modify the state of a communication network (e.g., initiate a connection, modify a firewall, block a port, filter data, etc.) sound an alarm, issue instructions to one or more persons, send an email, post a message to social media, etc.

In some embodiments, the engine module 128 and/or the alert module 136 is operable to cause an entry to be written to the alert database 116 and/or the historical database 115 when an alert is generated. The alert database 116 can store a record of past alerts (for example, in non-volatile memory) permanently and/or for a pre-determined period of time. In some embodiments, the data in the alert database 116 can provide an auditable record capturing, for example, the rule(s), parameter(s) of the rule(s) associated with the alert, the raw data that triggered the alert, data before and/or after the data that triggered the alert and/or any other suitable information. In some embodiments the alert database 116 can be used (e.g., by the analytics module 126 and/or the model module 132) to identify patterns, trends, statistics, and/or the like on alerts. In some instances, the engine module 128 can be operable to apply rules to data stored in the alert database 116.

In some instances, the alert database 116 can store contextual data, a subset of the streaming data, derivative data, etc. that may or may not be associated with an alert and/or a user-defined rule. In this way, the analytics module 126, the model module 132, and/or the engine module 128 can use the alert database 116 to identify patterns, trends, statistics and/or the like on streaming data that did not necessarily generate an alert. In some embodiments, the alert database 116 can be used in conjunction with the analytics module 126 and/or the engine module 128 to define complex rules, such as rules associated with time-averaged data and/or other time-correlated rules.

The historical database 115 can be one or more computing entities containing a processor and/or a memory (not shown), which can be structurally and/or functionally similar to the processor 112 and/or memory 114, respectively. The historical database 115 can be operable to store some or all of the data from the streaming data sources 105. For example, in some embodiments, the server 110 can be operable to ingest a copy or fork of the data from the data sources, while another copy or fork of the data is processed by other systems and/or devices. Some or all of this fork of the streaming data can be stored by the historical database 115. Although shown as a separate entity, in some embodiments, the historical database 115 can be associated with and/or operatively coupled to the memory 114. The historical database 115 can be used and/or accessed (e.g., by the analytics module 126, the model module 132, and/or the engine module 128) to identify patterns, trends, statistics and/or the like on streaming data that did not necessarily generate an alert. In some embodiments, the historical database 115 can be used in conjunction with the analytics module 126 and/or the engine module 128 to define complex rules, such as rules associated with time-averaged data and/or other time-correlated rules.

The historical database 115 and/or the alert database 116 can individually and/or collectively store a subset of the streaming data from the streaming data sources 105. Similarly stated, at least a portion of the data from the streaming data sources 105 may not be stored in the historical database 115 or the alert database 116 (e.g., at least a portion of the data from the streaming data sources 105 is not stored in non-volatile memory). In some embodiments, the engine module 128 can be operable to apply rules to stored (e.g., non-streaming) data stored in the historical database 115 and/or the alert database 116.

The client devices 150 are compute devices having a processor 152, a memory 154, an input module 156, an output module 158, and a network module 164. The processor 152, memory 154, and/or the network module 164 can be structurally and/or functionally similar to the processor 112, the memory 114, and/or the network module 134, respectively. The processor 152, memory 154, and/or the network module 164 can each be communicatively and/or operatively coupled to one or more of the other of the processor 152, memory 154, and/or the network module 164.

The input module 156 can be operable to receive signals from an input device (not shown), such as a mouse, keyboard, touchscreen, etc. The output module 158 can be operable to send signals to an output device (not shown), such as a monitor (e.g., a liquid crystal display, cathode ray tube, etc.), a speaker, etc.

As described in further detail herein, the client devices 150 can enable users to cause the server 110 to define rules and/or to receive alerts. In some embodiments, the client devices 150 can be operable to communicate with each other via the server 110 and/or the network 190. In some embodiments, a first client device 150 can be associated with a first analyst and a second client device 150 can be associated with a second analyst and/or a supervisor. The first and second client devices 150 can be operable to share rules and/or alerts. Similarly stated, the second client device 150 can access rules and/or alerts defined in response to a request from the first client device 150 and/or vice versa.

In some embodiments, some streaming data and/or some streaming data sources 105 may be access-controlled. For example, some data sources may be confidential, classified secret, classified top-secret, etc. In such an embodiment, each client device 150 can have an authorization level. The server 110 can be operable to receive the authorization level from each client device 150 and be operable to restrict access to data and/or alerts generated based on data if a given client device is not authorized to view and/or access the data and/or alerts.

In some embodiments, the input module 155 and/or the output module 158 can enable a user to cause the server 110 to define rules and to receive alerts via a graphical user display. For example, a graphical user interface (GUI) displayed on the output device can enable a user to send an inquiry (also referred to herein as a query) associated with the streaming data to the server 110. In response, the server 110 can define a rule. The GUI can enable the user to construct the query using visual tools, such as drop-down boxes, radio buttons, prompts for numerical values and/or ranges, etc. Similarly stated, the GUI can enable the user to formulate a query without the rigid syntax requirements of a typical programming language. The GUI can further display alerts, data associated with alerts, and/or allow the user to formulate additional queries based on previously-received alerts. In this way, the user can refine queries based on previous results.

Figure 2:
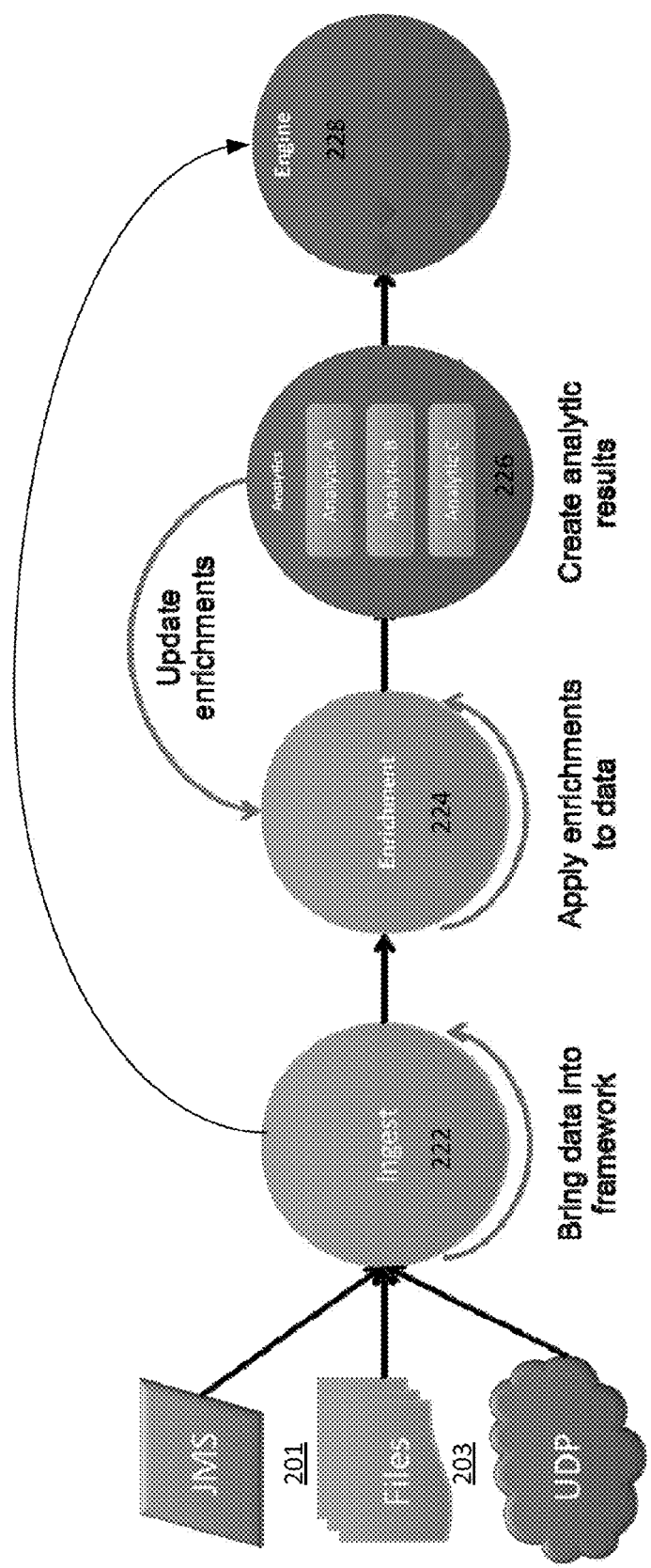
FIG. 2 is a schematic diagram of a data flow for complex-event analysis, according to an embodiment.

FIG. 2 is a schematic diagram of a data flow for complex-event analysis, according to an embodiment. The data-flow can be implemented on a server, such as the server 110 shown and described above with reference to FIG. 1. Streaming data can be received from one or more streaming data sources, using one or more data formats, such as a java messenger service (JMS) streaming data source 201, a file streaming data source 203 (e.g., which can use, for example, file transfer protocol (FTP) and/or any other suitable data format), and a user datagram protocol (UDP) streaming data source 205.

An ingest module 222, which can be structurally and/or functionally similar to the ingest module 122 shown and described above with reference to FIG. 1 can be operable to receive, format, and/or pre-process the streaming data. Similarly stated, the ingest module 222 can be operable to bring the streaming data into a data framework for further processing. For example, the ingest module 222 can be operable to translate data received via multiple data transfer protocols into a single data format. In some embodiments, the ingest module 222 can be operable to extract salient information from the streaming data sources. The ingest module can be operably coupled to an enrichment module 224 and/or an engine module 228, which can be structurally and/or functionally similar to the enrichment module 124 and/or the engine module 128, respectively. For example, the ingest module 222 can feed data directly to the engine module 228 without further processing, and/or the ingest module 222 can send data to the enrichment module 224 for further pre-processing.

The enrichment module 224 can be operably coupled to an analytics module 226, which can be structurally and/or functionally similar to the analytics module 126 shown and described with reference to FIG. 1. For example, the enrichment module 224 can be operable to add data to the data received from the ingest module 222, such as time stamp data (e.g., the time a datum was received and/or a time a datum was generated). For another example, the enrichment module 224 can add physical location data based on an Internet Protocol (IP) address included within the streaming data or associated with the source of the streaming data and/or by searching a location database (e.g., an online repository). The enrichment module 224 can add any other suitable additional information.

The analytics module 226 can be operable to perform additional analyses on the data received from the enrichment module 224. For example, the analytics module 226 can be operable to perform time-averaging and other suitable statistical and/or other suitable analysis on the data. In some embodiments, the analytics module 226 can be operable to apply one or more pre-defined or default rules (also referred to herein as feeder rules) to the data. If a feeder rule triggers an alert, the alert can be stored in a database. For example, the analytics module can include common or basic rules, such that, for example, an alert is generated if a datum exceeds (or is below) a particular value, if a datum indicates an object is within a particular area, and/or so forth. Such feeder rules can be used to populate an alert database such that some analysis can be performed of past data, even if such past data was not stored in persistent storage.

Although not shown in FIG. 2, the analytics module 226 can include or be operably coupled to a model module similar to the model module 132. In some embodiments, the analytics module 226 can be operable to feed data back to the enrichment module 224. In such an embodiment, the enrichment module 226 can update enrichments based on data received from the analytics module 226.

The engine module 228 can be operably coupled to the analytics module 226 and/or the ingest module 222. The engine module 228 can be functionally and/or structurally similar to the engine module 128 as shown and described above with reference to FIG. 1. For example, the engine module 228 can be operable to define rules, and/or apply rules to data received from the analytics module 226 and/or the ingest module 222.

Figure 3:
FIGS. 3-5 are example screenshots of various aspects of embodiments of a complex-event processing system.

FIG. 3 is a screenshot of a graphical user interface 300, according to an embodiment. The GUI 300 can be operable to be displayed via the output module 156 of the client device 150 shown and described above with reference to FIG. 1. The GUI 300 can enable the user of the client device 150 to make inquiries (also referred to herein as "queries") or requests for data against past, real-time, and/or future streaming data. For example, the GUI 300 can enable the user of the client device to use forms, drop-down menus, radio buttons and/or other graphical and/or textual input fields to form a query. Similarly stated, the GUI 300 can enable a user to form queries without requiring the user to use highly structured and/or programming syntax.

The GUI 300 includes a rule list pane 310 and a query formation pane 330. The rule list pane 310 includes a list of rules. The rule list pane can enable the user to activate rules. Active rules can be monitored by the client device 150. For example, the client device 150 can be communicatively coupled to the server 110 and operable to send queries to the server 110 such that the server 110 defines a rule. The rule list pane 310 can display a visual representation of rules defined in response to a query from the client device 150 and/or any other rules tracked by the client device 110 (e.g., the client device 150 can be operable to search a database of rules defined by other clients). When a rule is tracked by the client device 150 (e.g., when the rule is activated), alerts associated with and/or generated in response to that rule can be sent from the server 110 to the client device 150.

The query formation pane 330 is a portion of the GUI 300 that enables the user of the client device 150 to request that a rule be defined. The query formation pane 330 can prompt the user to input parameters and/or values used by the server 110 to define a rule. The query formation pane 330 need not require the user of the client device 150 to enter rule parameters in a programming language or other highly structured syntax. For example, the query formation pane 330 include prompts, text boxes, drop-down menus, radio buttons, and/or other graphic-based mechanisms to guide the user of the client device 150 to form a query.

Figure 4:
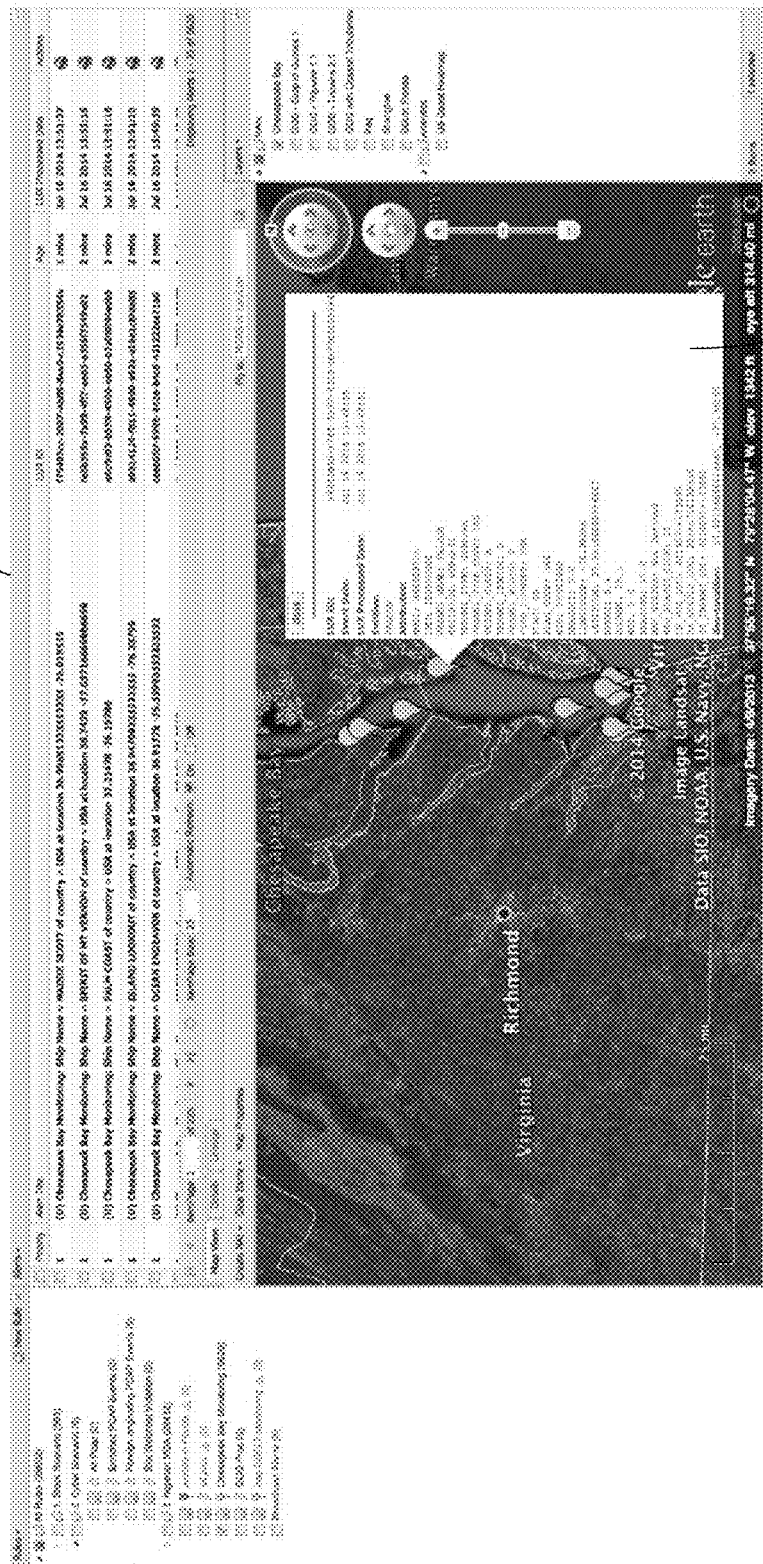

FIG. 4 is a screenshot of a graphical user interface 400, according to an embodiment. The GUI 400 can be operable to be displayed via the output module 156 of the client device 150 shown and described above with reference to FIG. 1. The GUI 400 can present information associated with rules and/or alerts. The GUI 400 includes a rule list 410, an alert list 450, and a content pane 460.

The rule list 410 can be similar to the rule pane 310 as shown and described above with reference to FIG. 3. The alert list 450 and/or the content pane 460 can be operable to display information associated with alerts. For example, the alert list 450 can be operable to display alerts associated the rules that are tracked by the client device 150. For example, when a datum from the streaming data sources 105 matches or satisfies a rule, the server 110 can send a signal representing the alert and/or datum to the client device. In response, the client device 150 can update the GUI 400 to display an alert in the alert list 450.

Similarly, the content pane 460 can display geographical information associated with one or more alerts. For example, if several alerts are associated with a particular geographical region, the content pane can provide a geographical summary of the results. Furthermore, when an alert is selected (e.g., via a mouse-over), additional data, such as raw data associated with the alert, can be displayed via a context or pop-up window 465. The alert list 450 and the content pane 460 can collectively allow a user of the client device to visualize the location and/or patterns of alerts. In some embodiments, the alert list 450 may not display every alert, but may be updated only when a pattern of alerts occurs and/or when a number of alerts associated with a particular rule or group of rules exceeds a pre-determined or configured threshold. For example, the alert list 450 can be less "noisy" a stream that displays every alert, and/or can provide a user with (or only with) an indications of higher-level alerts.

In some embodiments, the GUI 400 can be suitable for use in a team-based environment. For example, rules displayed in the rule list 410, and/or alerts displayed in the alert list 450 and/or the content pane 460 can be associated with other members of a team of analysts (e.g., associated with other client devices 150). Although not shown in FIG. 4, in other embodiments, a GUI can include other tools, such as a flipwidget and/or a channel chat that can improve teamwork, management, and/or oversight between a number of client devices 150. For example, a channel chat can allow the user of the client device to communicate with client devices of other analysts. For example, a chat client can allow the user of one client device to send messages to users of other client devices via the server.

For another example, a flipwidget can be operable to provide information and/or present a notification associated with patterns and or quantities of alerts. Similarly stated, a flipwidget can notify a user when a number of alerts (e.g., from any of several client devices) associated with a rule exceeds a pre-determined threshold. As an illustration, in an embodiment that include at least two client devices, the first client device can be associated with an analyst and the second client device can be associated with another analyst or a supervisor. The flipwidget can be operable to notify the user of the second client device when rules that were defined in response to a query requested by the first user device have generated a number of alerts that exceeds a pre-defined and/or configured threshold. In this way, when a rule is triggered multiple times, the alerts can be escalated to a supervisor and/or another analyst. In addition of alternatively, the GUI 400 and/or the flipwidget can provide a summary and/or a higher level overview of particularly active rules.

Figure 5:
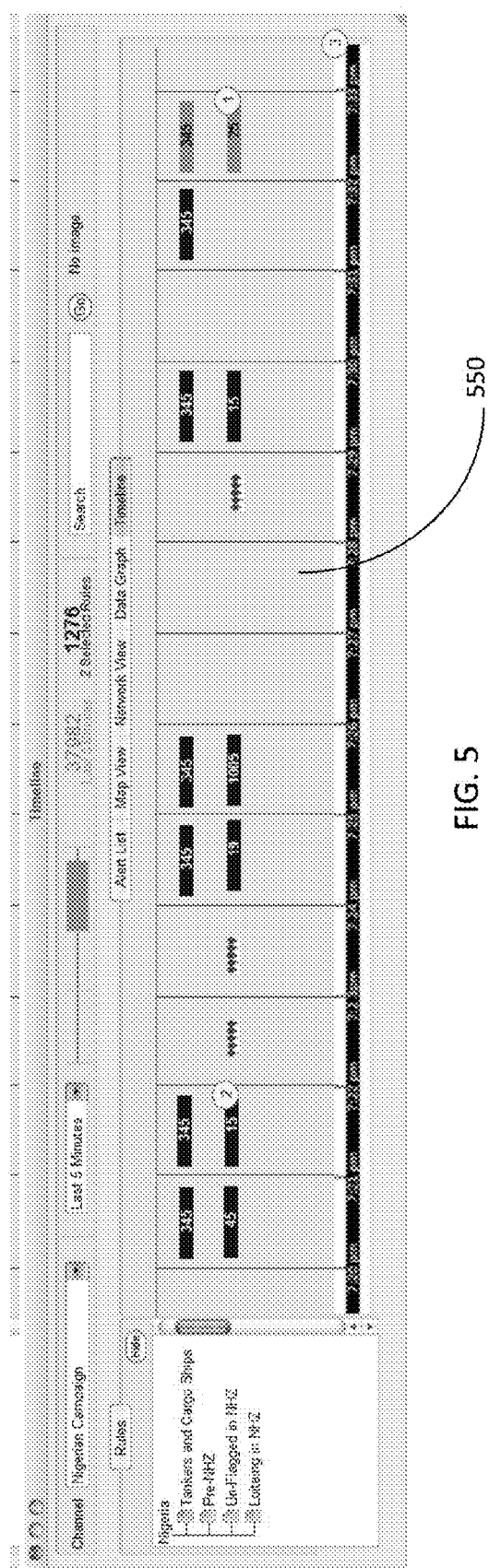

FIG. 5 is a screenshot of a timeline 550, according to an embodiment. The timeline 550 can be operable to be displayed via the output module 156 of the client device 150 shown and described above with reference to FIG. 1. The timeline 550 can present information associated with rules and/or alerts.

The timeline 550 can be suitable to illustrate patterns of alerts, providing, for example, contextual temporal data which can aid the analyst and/or supervisor in detecting time-based patterns. For example, each or some alerts can appear on the timeline 550 associated with the time the alert was generated and/or a time associated with a datum that caused the alert to be generated. In this way, if a number of alerts occur at a particular time, the timeline 550 can provide a visual indication of such clustering, temporal patterns, and/or any other suitable time-based correlations.

Figure 6:
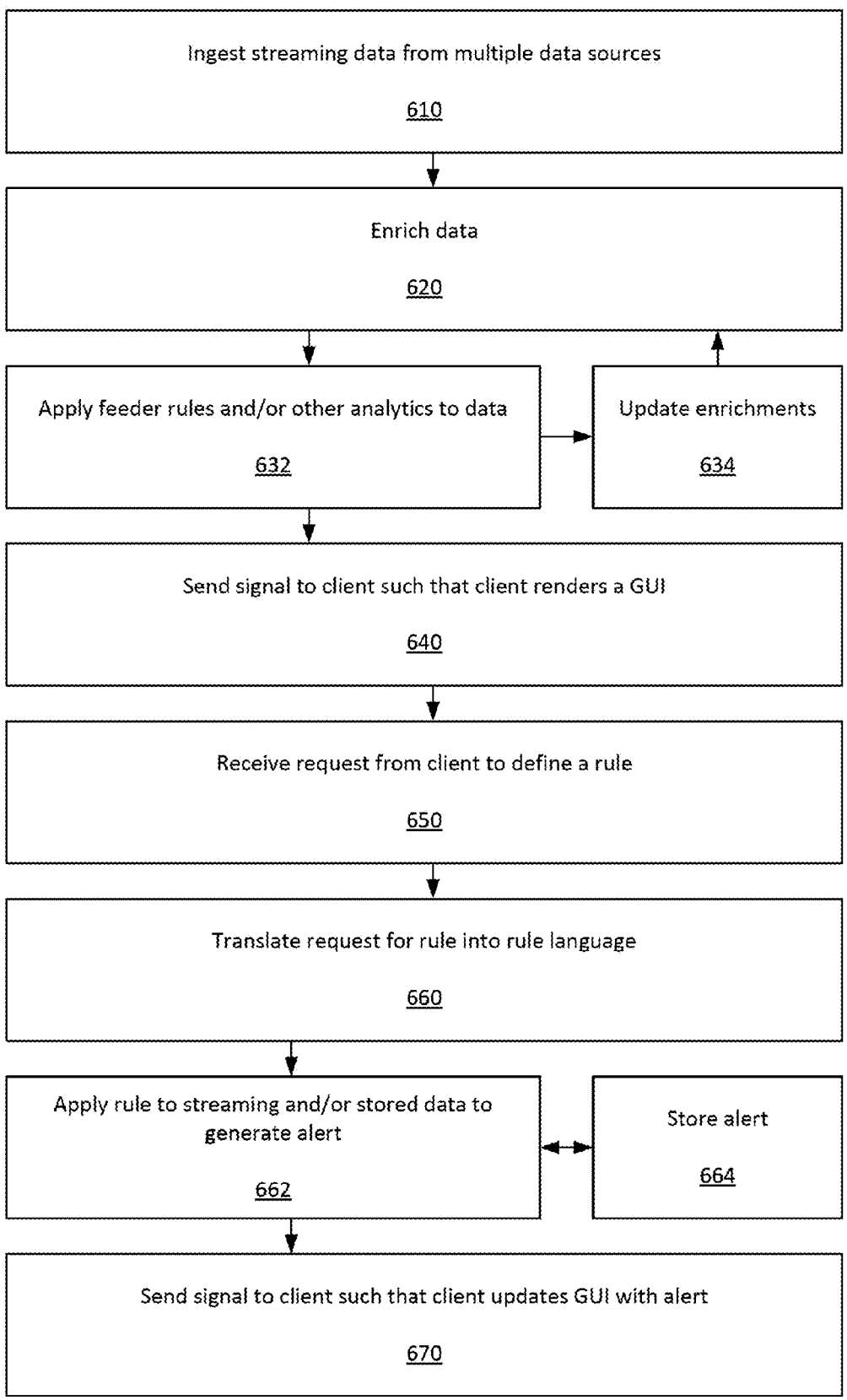
FIGS. 6 and 7 are flow charts of methods of complex-event processing, according to two embodiments.

FIG. 6 is a flow chart of a method of performing complex-event processing, according to an embodiment. The method shown in FIG. 6 can be a computer-implemented method. For example, the method of FIG. 6 can be executed on the processor 112 of the server 110 shown and described above with reference to FIG. 1. In other embodiments, the method can be distributed such that certain method steps are executed on one processor and other method steps are executed on another processor.

Streaming data from multiple data sources can be ingested, at 610. For example, the ingest module 122 can be operable to receive and/or process data from the data sources 105 as shown and described above. Ingesting the streaming data, at 610, can include processing and/or reformatting streaming data without recording the streaming data in persistent storage. At 620, the data can be enriched, for example by the enrichment module 124. Feeder rules and/or other analytics can be applied to the data at 632, for example by the analytics module 126. The enrichments can be updated, at 634, based, for example, on analytics performed at 632. Similarly stated, the analytics can feed back into the enrichment module such that the analytics can be enriched and/or future streaming data can be subject to updated enrichments. For example, an analytic applied at 632 can be operable to identify an entity and/or data source as including potentially interesting or salient information. Updating the enrichments, at 634 can include activating an enrichment for that entity and/or data source. Activating such an enrichment, at 634, only for potentially interesting data sources may reduce processing requirements, for example if the enrichment is computationally expensive. In this way, potentially interesting or salient information can be enriched, and while data sourced by other entities might not be enriched, conserving system resources.

At 640, a signal can be sent to a client (e.g., the client device 150) such that the client renders a GUI. For example, at 640, the server 110 can send a signal to the client device 150 such that a user of the client device 150 can form queries against the streaming data, for example, via the GUI. In some embodiments, the signal sent at 640 can include categorical information regarding the streaming data sources (e.g., identifying the types and/or sources of data received) such that the client device 150 can inform the user of the type of data available to be queried. In addition or alternatively, the signal sent at 640 can include a summary of the streaming data, high-level analytics, etc. (e.g., averages, minimums, maximums, etc.) such that the client device 150 can provide the user with information associated with the streaming data to aid in query formation.

At 650, a request to define a rule can be received. For example, the user of the client device 150 can use a GUI to form a query that can be received at 650. Upon receiving the request, a rule can be defined, at 660. For example, the user of the client device 150, using the GUI, can provide information to the server 110. In response, the server 110 can translate the user's request into a programmatic format suitable to be executed by the processor 112 and/or the engine module 128 such that the rule can be applied to the streaming data. Similarly stated, the request received at 650 may not be sufficiently structured to identify matching data from the streaming data sources. The server 110 can be operable to translate the graphically entered query into a programmatic rule, at 660. For example, the server 110 can receive parameters entered by the user of the client device, or parameters selected by the user of the client device from a list of possibilities and use those parameters to populate a fixed template that forms the query. In addition or alternatively, the user can direct the server 110 by specifying goals to a machine learning tool that supplies PMML to the analytics module 126 to execute.

At 662, the rule can be applied to the streaming data. An alert can be generated when a datum from the streaming data matches and/or satisfies the rule. When an alert is generated, it can be stored, at 664, for example, in a database (e.g., the alert database 116 shown and described with reference to FIG. 1). At 670, a signal can be sent to the client device 150 such that the GUI is updated with the information representing alert. Similarly stated, a signal to cause a graphical representation of the alert to appear via the GUI can be sent to the client device 150.

In some embodiments, the rule can be applied, at 662, to historical data. For example, the rule can include a time element and/or can be based on previous alerts, which can be stored in the alert database 116. For example, a rule can trigger an alert if a price of a stock remains above a threshold for a period of time. To apply such a rule, the engine module 128 can apply the rule to data stored in the historical database 115 and/or the analytics module 126 can generate a stream of data indicating the time elapsed since the stock crossed the threshold. For another example, a rule can trigger an alert if a parameter in an industrial process has exceeded a threshold a particular number of times within a particular time period. To apply such a rule, the engine module 128 can alert each time the parameter exceeds the threshold and store a representation of the alert in the alert database 116. The engine module 128 can further access data in the alert database 116 and ascertain whether more than the specified number of alerts occurred or were triggered within the specified time period.

Figure 7:
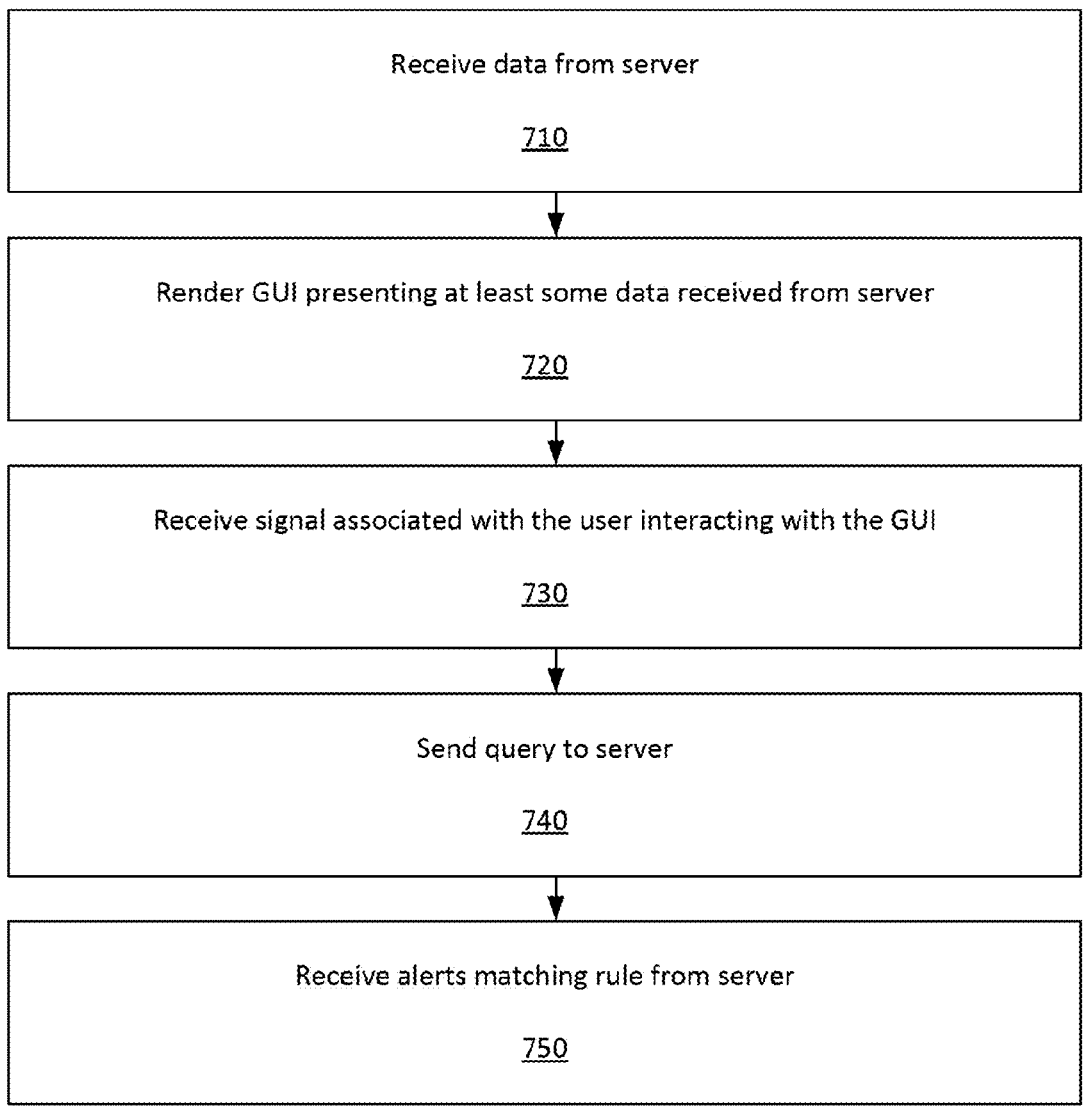

FIG. 7 is a flow chart of a method of performing complex-event processing, according to an embodiment. The method shown in FIG. 7 can be a computer-implemented method. For example, the method of FIG. 7 can be executed on the processor 152 of the client device 150 shown and described above with reference to FIG. 1. In other embodiments, the method can be distributed such that certain method steps are executed on one processor and other method steps are executed on another processor.

At 710, the client device 150 can receive data (e.g., from the server 110). For example, the client device 150 can receive the signal sent by the server, at 640, as shown and described with reference to FIG. 6. The signal received at 710 can be operable to cause the client device to render a GUI, at 720. The GUI can provide information associated with the streaming data. For example, the GUI can provide guides and or prompts to aid the user in forming a query.

At 730, a signal associated with the user interacting with the GUI can be received. For example, the user can provide information associated with a query via the input module 156. At 740, the client device 150 can send a signal (e.g., to the server 110) associated with the query. In response the server 110 can define a rule and perform complex-event processing on streaming data. At 750, one or more alerts associated with data matching the query can be received. In some embodiments, the client device 150 can update the GUI to reflect the alerts.

While various embodiments have been described above, it should be understood that they have been presented by way of example only, and not limitation. For example, certain embodiments describe sending and/or receiving signals, such as to update a GUI. Other embodiments can include sending any suitable signal, such as email, a representational state transfer, etc. Furthermore, although various embodiments have been described as having particular features and/or combinations of components, other embodiments are possible having a combination of any features and/or components from any of embodiments where appropriate as well as additional features and/or components. For example, any of the compute devices described herein (e.g., the server 110, and/or the client devices 150) can be distributed computing entities having any number of processors and/or memories in any number of locations. Where methods described above indicate certain events occurring in certain order, the ordering of certain events may be modified. Additionally, certain of the events may be performed repeatedly, concurrently in a parallel process when possible, as well as performed sequentially as described above. Furthermore, certain embodiments may omit one or more described events.

Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RAM devices. Other embodiments described herein relate to a computer program product, which can include, for example, the instructions and/or computer code discussed herein.

Some embodiments described herein reference persistent and/or non-persistent storage. Data is considered to be stored in persistent storage if it is written to a non-volatile memory and configured or intended to be retrieved by an unspecified (e.g., not pre-defined) process at an unspecified time in the future. Data is not considered to be persistently stored if it is stored in volatile memory, such as RAM, a cache, a buffer, etc. and/or if it is configured and/or intended to be retrieved by only a specific process at a specific time period. Similarly stated, data that is written to a memory for the purpose of being retrieved and/or modified by a specific process for further analysis and thereafter purged, rolled-over, and/or overwritten is not persistently stored, while data that is stored to a disk for archival purposes such that it can be retrieved by some future unanticipated process is considered to be persistently stored. For example, streaming data can be considered to be non-persistently stored if it is temporarily stored for a relatively short period and configured or intended to be retrieved by a specific process at a specific time period for, for example, real-time (or substantially real-time) processing to analyze the streaming data as received.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A method comprising:
    receiving, at a first compute device, streaming data associated with locations of a plurality of objects and received from a plurality of streaming data sources, at least a portion of the streaming data not being stored in persistent storage;
    receiving, from a client device, a signal associated with a first query against the plurality of streaming data sources, the first query associated with a user interacting with a graphical user interface and with objects from the plurality of objects within a distance of each other;
    defining a first rule based on the first query;
    applying the first rule to the streaming data, a subset of streaming data from the plurality of streaming data sources satisfying the first rule;
    defining a stream of derivative data identifying objects from the plurality of objects within the distance of each other based on the subset of streaming data;
    receiving, from the client device, a signal associated with a second query against the stream of derivative data;
    defining a second rule based on the second query, a subset of the stream of derivative data satisfying the second rule;
    storing, in persistent storage, a plurality of alerts, the plurality of alerts associated with the subset of the stream of derivative data; and
    sending a signal associated with the plurality of alerts to a second compute device.

2. The method of claim 1, wherein the second compute device is the client device, the signal associated with the plurality of alerts is sent to the client device such that the graphical user interface is updated based on the plurality of alerts.

3. The method of claim 1, wherein the client device is a first client device, the graphical user interface is a first graphical user interface, and the signal associated with the plurality of alerts is sent to the second compute device is at least one of an email, a representational state transfer, or a signal sent to a second client device such that a second graphical user interface is updated based on an alert from the plurality of alerts.

4. The method of claim 1, further comprising:
    receiving, from the client device, a signal associated with a third query, the third query associated with the user interacting with the graphical user interface;
    defining a third rule based on the third query;
    applying the third rule to each streaming data source from the plurality of streaming data sources, including the stream of derivative data, in parallel.

5. The method of claim 1, wherein:
    a first streaming data source from the plurality of streaming data sources is associated with a first access control level;

a second streaming data source from the plurality of streaming data sources is associated with a second access control level different from the first access control level; and applying the first rule to the streaming data includes:
identifying an authorization level associated with the client device; and
applying the first rule to the first streaming data source but not to the second streaming data source based on the authorization level not being below the first access control level but being below the second access control level.

6. The method of claim 1, wherein, the subset of streaming data is a first subset of streaming data, and the plurality of alerts is a first plurality of alerts, the method further comprising:
applying a third rule to the plurality of streaming data sources before applying the first rule to the plurality of streaming data sources, a second subset of streaming data from the plurality of streaming data sources satisfying the third rule;
storing, in persistent storage, a second plurality of alerts, the second plurality of alerts associated with the second subset of streaming data;
receiving, from the client device, a signal associated with a fourth query against the first plurality of alerts and the second plurality of alerts;
defining a fourth rule based on the fourth query;
applying the fourth rule to the first plurality of alerts and the second plurality of alerts;
generating an alert based on at least one datum from the first plurality of alerts or at least one datum from the second plurality of alerts satisfying the fourth rule; and
sending a signal associated with the alert to the client device such that the graphical user interface is updated based on the alert.

7. The method of claim 1, wherein the plurality of alerts are a first plurality of alerts, the method further comprising:
applying the second rule to the stream of derivative data and the streaming data, each alert from the second plurality of alerts associated with a datum from the stream of derivative data or a datum from the streaming data.

8. The method of claim 1, the method further comprising:
continuously applying the second rule in real time to the stream of derivative data.

9. A non-transitory processor readable medium storing code representing instructions to be executed by a processor, the code comprising code to cause the processor to:
receive, at a compute device, streaming data associated with locations of a plurality of objects and received from a plurality of data sources, at least a portion of the streaming data not being stored in persistent storage;
send a first signal to a first client device such that the first client device renders a first graphical user interface presenting at least a portion of the streaming data;
receive, from the first client device, a request to define a first rule associated with objects from the plurality of objects within a distance of each other, the request to define the first rule received in response to a user of the first client device making a form-based selection via the first graphical user interface;
define a stream of derivative data identifying objects from the plurality of objects within the distance of each other based on applying the first rule to the streaming data;
receive, from a second client device different from the first client device, a request to define a second rule in response to a user of the second client device making a form-based selection via a second graphical user interface;
apply the second rule to the stream of derivative data to identify a datum from the stream of derivative data satisfying the rule; and
send a second signal to the second client device such that an alert is presented via the second graphical user interface, the alert based on the datum from the stream of derivative data satisfying the second rule.

10. The non-transitory processor readable medium of claim 9, wherein the datum is a first datum, the code further comprising code to cause the processor to:
store a second datum satisfying the first rule in persistent storage; and
send a third signal to the first client device such that a third graphical user interface presents a notification, the third signal sent in response to a quantity of data from the streaming data satisfying the first rule exceeding a pre-defined threshold, the third graphical user interface configured to present notifications associated with the first rule and the second rule.

11. The non-transitory processor readable medium of claim 9, wherein the datum is a first datum, the code further comprising code to cause the processor to:
send a third signal to the first client device such that an alert is presented via the first graphical user interface;
receive, from the second client device, a request to define a third rule;
apply the third rule to the streaming data, including the stream of derivative data to identify a second datum from at least one of the streaming data or the stream of derivative data satisfying the third rule;
store the second datum in persistent storage; and
send a fourth signal to the second client device such that the second graphical user interface presents a notification, the notification based on the first datum and the second datum.

12. The non-transitory processor readable medium of claim 9, wherein the datum is a first datum, the graphical user interface is a first graphical user interface configured to present alerts associated with the first rule, the code further comprising code to cause the processor to:
store the second datum in persistent storage; and
send a third signal to the first client device such that a third graphical user interface presents a notification, the third signal sent in response to at least one of (1) a quantity of data from the stream of derivative data satisfying the second rule or (2) a quantity of data from the streaming data satisfying the first rule exceeding a pre-defined threshold.

13. The non-transitory processor readable medium of claim 9, wherein the datum is a first datum, a second datum from the streaming data satisfying the first rule, and the alert is a first alert, the code further comprising code to cause the processor to:
store the second datum in persistent storage; and
generate a second alert based, at least in part, on the second datum satisfying the first rule.

14. The non-transitory processor readable medium of claim 9, wherein the alert is a first alert, the signal sent to the second client device such that the first alert is presented at a first time, the code further comprising code to cause the processor to:
store the second rule; and send a signal to the second client device at a second time after the first time such that a second alert is presented via the second graphical user interface.

15. The non-transitory processor readable medium of claim 9, wherein the first rule is applied to a first data source from the plurality of data sources, the code further comprising code to cause the processor to:
define the first rule, the first rule having a first set of parameters associated with the first data source; and
define a third rule, the third rule having a second set of parameters associated with a second data source from the plurality of data sources; and
apply the third rule to the second data source.

16. The non-transitory processor readable medium of claim 9, wherein the alert is a first alert, the code further comprising code to cause the processor to:
define the second rule in response to receiving the request to define the second rule;
send a signal representing the second rule to a third client device different from the second client device;
receive, from the third client device, a request to apply the second rule to the stream of derivative data; and
send a signal to the third client device such that a second alert associated with the second rule is presented via a third graphical user interface.

17. The non-transitory processor readable medium of claim 9, wherein the second rule is associated with a first location at a first time and a second location at a second time, applying the second rule includes applying the second rule at the first time, and the datum satisfying the second rule is a first datum associated with the first location, the code further comprising code to cause the processor to:
apply the second rule to the stream of derivative data at a second time, a second datum from the stream of derivative data associated with the second location satisfying the second rule at the second time.

18. The non-transitory processor readable medium of claim 9, wherein the stream of derivative data is not stored in persistent storage.

19. A non-transitory processor readable medium storing code representing instructions to be executed by a processor, the code comprising code to cause the processor to:
receive, at a first compute device, streaming data associated with locations of a plurality of objects, at least a portion of the streaming data not being stored in persistent storage;
receive, from a client device, a signal associated with a first query against the plurality of streaming data sources, the first query associated with objects from the plurality of objects within a distance of each other;
define a rule based on the first query;
apply the rule to the streaming data such that a stream of derivative data is defined based on the subset of streaming data, the stream of derivative data identifying objects from the plurality of objects within the distance of each other;
receive, from the client device, a signal associated with a second query against the stream of derivative data to identify a subset of the stream of derivative data that satisfies the second query;
store, in persistent storage, a plurality of alerts associated with the subset of the stream of derivative data; and
send a signal associated with the plurality of alerts to a second compute device.

20. The non-transitory processor readable medium of claim 19, wherein:
the signal associated with the first query is received at a first time when a first object from the plurality of objects is within the distance of a second object from the plurality of objects;
the rule is applied to the streaming data such that the stream of derivative data is updated as the streaming data is received;
the signal associated with the second query is received at a second time when the first object is not within the distance of the second object such that at the second time the stream of derivative data does not identify the first object as being within the distance of the second object.

21. The non-transitory processor readable medium of claim 19, wherein:
the signal associated with the first query is received at a first time when a first object from the plurality of objects is not within the distance of a second object from the plurality of objects;
the rule is applied to the streaming data such that the stream of derivative data is updated as the streaming data is received;
the signal associated with the second query is received at a second time when the first object is within the distance of the second object such that at the second time the stream of derivative data identifies the first object as being within the distance of the second object.

* * * * *